April 16, 1929.　　　G. H. FORDHAM　　　1,709,615
HOG CATCHER TONGS
Filed March 26, 1928
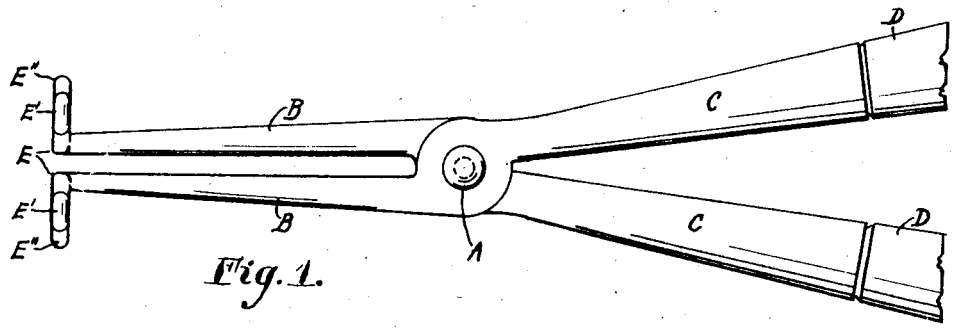
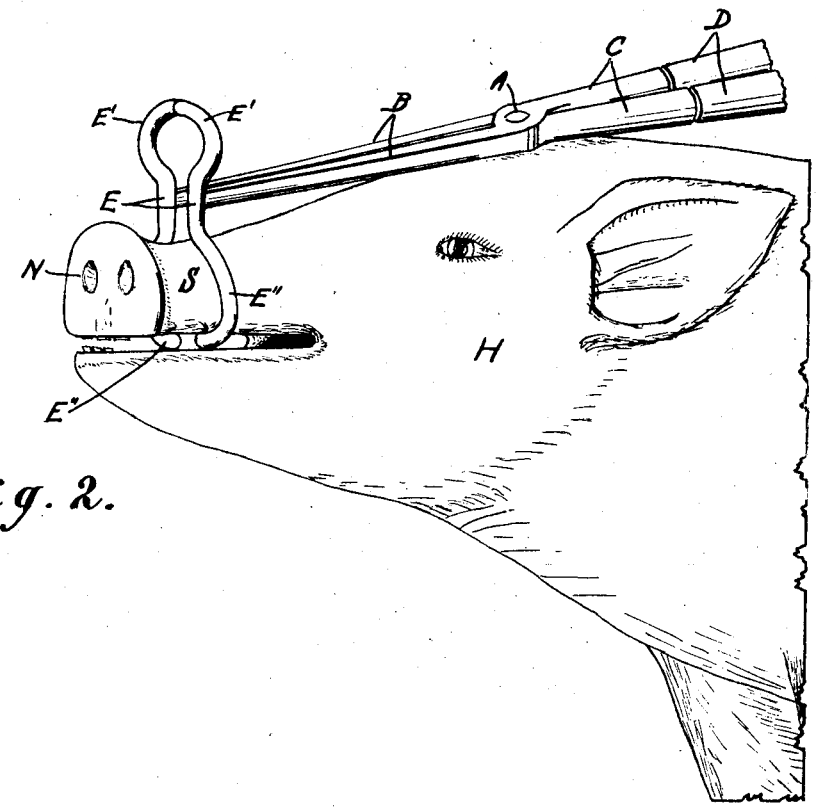
INVENTOR:
George H. Fordham
BY David E. Carlsen
ATTORNEY.

Patented Apr. 16, 1929.

1,709,615

UNITED STATES PATENT OFFICE.

GEORGE H. FORDHAM, OF WALNUT GROVE, MINNESOTA.

HOG-CATCHER TONGS.

Application filed March 26, 1928. Serial No. 264,596.

My invention relates to a hog-catching device which might more aptly be termed simply a hog-catcher and the main object is to provide a simple, effective and inexpensive device having various uses mainly such as obtaining complete control of a hog when being driven on board a car for shipment, or to hold a hog for branding or ear marking and other purposes well known to hog breeders and farmers in general.

In the accompanying drawing:—

Fig. 1 is a top view of my improved hogcatcher in a preferred form and showing only a portion of the wooden handles used.

Fig. 2 is a perspective view of my device in operative position on the snout of a hog.

Referring to the drawing by reference letters, my device comprises a pair of tong members crossed and pivotally connected as at A forward of which each member comprises an elongated arm B and rearward of which each comprises an elongated rearwardly flared tubular socket C for retaining frictionally a handle D of suitable length and material, said socket ends C being normally spread apart toward their rear ends. The handles D may of course be spread or closed to spread or close the arms A. The latter arms are provided with counterpart transverse and vertically disposed hog engaging clamp members each comprising an integral two-arched member, each arch approximately semi-circular and opening inwardly and both arches of each member connected by a short straight bar E fixed transversely of and integrally with the outer end of an arm B. One set of said opposite arches is preferably of larger radius than the other, the smaller arches designated E' and the larger ones E'' being about twice the size of the smaller ones and both forming clamping loops when pressed toward each other.

The clamping jaws thus formed are used to engage the snout S of a hog H as shown in Fig. 2 just back of the nostrils N, the operator standing rearwardly of the head of the hog, spreading the clamping arms until the jaws E' or E'' are horizontally opposite the snout and then closing the device so the jaws engage the snout. By holding the handles pinched toward each other a hog's snout is thus firmly engaged and the animal can be directed to move as desired or held without resistance.

It is obvious that the use of my device facilitates the handling of hogs, large or small, for any purpose such as loading them on cars, holding them while being branded or for clipping the ears and any other purpose, this device having proven highly efficient for guiding a hog as desired or holding it in any desired position.

I claim:

A hog catcher of the class described comprising an elongated pair of tongs, the two members of said tongs being crossed and pivotally connected, handles rearwardly of said pivot, transverse jaw members formed integral at the front end of each tong arm extending forward of the said pivot, said jaw members comprising counterpart inwardly opening vertically spaced arched jaws, one arch smaller than the other and a bar connecting said arches and fixed to the extremity of the tong arm, said clamp members adapted to be closed toward each other by said handles to form two clamping jaws adapted to engage the snout of a hog.

In testimony whereof I affix my signature.

GEORGE H. FORDHAM.